US006396600B1

(12) United States Patent
Davies

(10) Patent No.: US 6,396,600 B1
(45) Date of Patent: May 28, 2002

(54) ARRANGEMENT FOR TRANSMITTING, RADIATING AND RECEIVING HIGH-FREQUENCY SIGNALS

(75) Inventor: Mark Davies, Braunschweig (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/116,083

(22) Filed: Jul. 15, 1998

(30) Foreign Application Priority Data

Jul. 29, 1997 (DE) ........................................ 197 32 503

(51) Int. Cl.[7] .......................... H04B 10/08; H04Q 7/00

(52) U.S. Cl. ....................................... 359/110; 455/523

(58) Field of Search ................................ 333/245, 260; 379/22; 359/188, 195, 110, 179; 455/523

(56) References Cited

U.S. PATENT DOCUMENTS

| | | | | |
|---|---|---|---|---|
| 3,975,700 A | | 8/1976 | Halstead | 333/237 |
| 4,012,662 A | * | 3/1977 | Martin | 455/523 |
| 5,039,995 A | | 8/1991 | Hulbert | 343/853 |
| 5,187,803 A | * | 2/1993 | Sohner et al. | 455/3.03 |
| 5,602,834 A | | 2/1997 | Dean et al. | 370/335 |

FOREIGN PATENT DOCUMENTS

| | | | |
|---|---|---|---|
| DE | 26 04 907 A1 | | 9/1976 |
| DE | 22 35 336 A | | 2/1991 |
| DE | 44 22 325 A1 | | 1/1996 |
| DE | 44 32 666 A1 | | 3/1996 |
| DE | 44 34 055 A1 | | 3/1996 |
| DE | 195 03 440 A1 | | 8/1996 |
| DE | 195 03 744 A1 | | 8/1996 |
| DE | 195 21 215 A1 | | 12/1996 |
| FR | 2419620 A | * | 11/1979 |

OTHER PUBLICATIONS

Hettstedt, Heinz–Dieter. "Arrangement for Transmitting, Radiating, and Receiving High–Frequency Signals." Dec. 19, 1996. (English–language translation of foreign patent document DE 195 21 215).*

Proceedings of the 1st International Conference on Tunnel Control and Communication, Nov. 28–30, 1994, pp. 181 to 192.

Grüssi, Otto, König, Peter: Radio Links for Highway Tunnels. In: Technische Mitteilungen PTT, Jul. 1978, S. 285–293.

* cited by examiner

*Primary Examiner*—Jason Chan
*Assistant Examiner*—Christina Y Leung
(74) *Attorney, Agent, or Firm*—Ware, Fressola, Van Der Sluys & Adolphson LLP

(57) ABSTRACT

A arrangement is described for transmitting, radiating and receiving high-frequency signals. The arrangement is comprised of a system connected to a transmitting and receiving device (3) which includes at least one high-frequency element (1) capable of guiding electromagnetic waves and a first signal cable (5) extending parallel thereto. To improve the service reliability of the arrangement, a second signal cable (6) which is also connected to the transmitting and receiving device (3), is arranged parallel to the high-frequency element (1) and maintains a significant spatial separation to the first signal cable (5). The two signal cables (5, 6) are alternatingly connected at coupling points ($K_1$–$K_n$) to the high-frequency element (1) in such a way that the one signal cable (6) is connected to all even numbered coupling points ($K_2$–$K_{2n}$) and the other signal cable (5) is connected to all odd numbered coupling points ($K_1$–$K_{2n\pm1}$), wherein the coupling points are numbered successively with integer numbers, starting at the transmitting and receiving device (3) . A malfunction of one of the signal cables (5, 6) does consequently not impair the operation of the arrangement.

6 Claims, 2 Drawing Sheets

ARRANGEMENT FOR TRANSMITTING, RADIATING AND RECEIVING HIGH-FREQUENCY SIGNALS

BACKGROUND OF THE INVENTION

1. Technical Field

The invention relates to an arrangement for transmitting, radiating and receiving high-frequency signals, comprising a system connected to a transmitting and receiving device and comprising at least one high-frequency element capable of guiding electromagnetic waves and a first signal cable extending parallel to the high-frequency element, wherein the signal cable is coupled to the high-frequency element at spaced apart coupling points in a manner suitable for carrying the high-frequency signals (Proceedings of the 1$^{st}$ International Conference on Tunnel Control and Communication, Nov. 28–30, 1994, pages 181 to 192).

2. Description of the Prior Art

Arrangements of this type are used, for example, with mobile telephone systems where an information link is desired between a stationary station and a mobile "station". The arrangement is particularly suited, for example, for tunnel sections in which conventional wireless radio transmission is not possible at all or only with severe limitations. A "high frequency element" employed in such arrangements is, for example, a radiating high frequency cable, hereinafter referred to as "RHF cable". The RHF cable can be formed as a single piece, but can also be subdivided into segments. The high frequency element can also be in the form of a so-called array antenna comprised of a number of spaced-apart directional antennae. Although in the following only the RHF cable will be described, the associated discussions and explanations are meant to also include the other embodiments.

Because of the radiating properties of a RHF cable, high frequency (HF) energy can be received by or coupled into the RHF cable at each location thereof with appropriate antennae. However, the HF signals are strongly attenuated due to the construction of the outer conductor. Therefore, intermediate amplifiers must be incorporated in the RHF cable for longer tunnel sections so that the HF signals are received error-free along the entire transmission path.

With the conventional arrangement described in the in the aforementioned publication "Proceedings . . . ", such intermediate amplifiers are not required. The RHF cable is here subdivided into segments which are arranged next to each other in the longitudinal direction. At predetermined distances, the segments of the RHF cable are connected in pairs with the signal cable which in this case is an optical fiber cable. Electro-optical converters are here connected between the respective segments and the signal cable. In addition, amplifiers are provided at the coupling points so that the HF signals are reliably transmitted and received along the respective two connected segments of the RHF cable. This known arrangement requires a large number of individual components for the transmission path, in particular a large number of active components. Damage to the components or a malfunction of components can noticeably interrupt the signal transmission. Signal transmission is completely interrupted if the signal cable is damaged or severed or when the transmitting and receiving device malfunctions.

SUMMARY OF THE INVENTION

It is therefore an object of the invention to improve the arrangement described so that the system can operate even if the signal cable is damage.

The object is solved by the invention in:

that parallel to the high-frequency element and with a significant spatial separation to the first signal cable, there is arranged a second signal cable which is also connected to the transmitting and receiving device, and that the two signal cables are alternatingly connected to the high-frequency element in such a way that one signal cable is connected to all even numbered coupling points and the other signal cable is connected to all odd numbered coupling points, wherein the coupling points are numbered consecutively with integer numbers, starting at the transmitting and receiving device.

With this arrangement, the information is always transmitted via the two signal cables with low loss. Information received from the transmitter is fed at the coupling points into the RHF cable with adjustable power so that HF signals with a sufficient level can always be received along the RHF cable. The range of the transmission can thereby be significantly increased without using intermediate amplifiers, even if a substantial number of coupling points exist between the RHF cable and the two signal cables along that transmission path. The same argument also applies to HF signals from a vehicle radio transceiver or a portable radio transceiver which are fed into the RHF cable.

The second signal cable which is installed with a sufficiently large spatial separation from the first signal cable, improves the reliability of the transmission path. Even if one of the signal cables is damaged or destroyed, the system continues to operate since the RHF cable stays connected to the transmission and receiving device via the other signal cable. This enhanced service reliability is accomplished in a very simple manner. Each of the two signal cables is connected sequentially only with every other coupling point. Consequently, the equipment costs and the construction of the coupling points remain the same. The only requirement is a second signal cable.

Each of the two signal cables supplies—in cooperation with the associated coupling points—segments of the RHF cable in both transmission directions. Each segment of the RHF cable receives signals from two different coupling points—as long as both signal cables are operational. In the other transmission direction, signals received by the RHF cable are also transmitted to the two coupling points which form the boundary of the respective segment.

With the separation between the coupling points properly defined, the segments of the RHF cable are reliably supplied by the still functioning coupling points even if one of the signal cables malfunctions. This means that the signals intended for a segment of the RHF cable are only fed by one coupling point in such a way that the receive level is sufficiently high along the entire length of the segment. This also means that signals received by the RHF cable are transmitted by the cable with such a low loss that the signals reach the respective single coupling point with a sufficiently high level.

If the HF cable is subdivided into segments in a manner known in the art wherein the segments are consecutively arranged in the longitudinal direction, then a single coupling point is associated with each segment. It is, for example, advantageous to subdivide the HF cable to eliminate interferences. In the event of a malfunction of a signal cable or of the associated portion of the transmitting and receiving device, the segments must be automatically and reliably connected through. For example, in DE 195 03 744 A1 there are described components provided with a switch which can be controlled by a pilot signal of the transmitting and receiving device and can satisfy the aforementioned requirements.

Embodiments of the invention will be described in the subsequent description with reference to the schematic drawings.

DETAILED DESCRIPTION OF THE INVENTION

Figure 1:
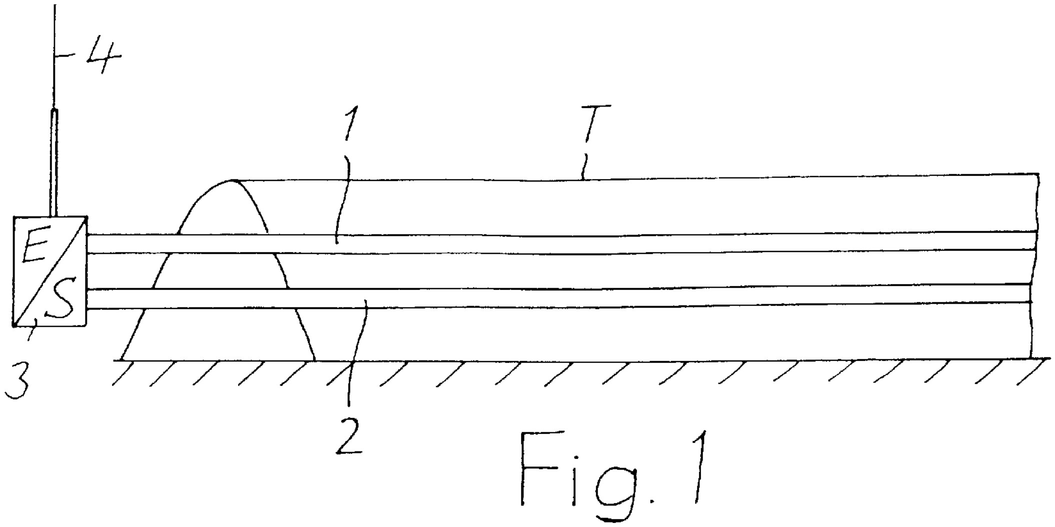
FIG. 1 is a schematic diagram of the arrangement of the invention.

The arrangement illustrated in FIG. 1 depicts schematically, i.e. without showing all the details, the basic construction of a transmission path arranged in a tunnel T as well as an RHF cable 1 and a signal system 2 extending parallel thereto and connected to the transmitting and receiving device 3 which comprises a transmitter S and a receiver E and can also include an antenna 4. According to FIG. 2, the signal system 2 consists of two signal cables 5 and 6 capable of low loss transmission of HF signals.

Each of the signal cables 5 and 6 can be an optical fiber cable, a coaxial HF cable with a closed outer conductor or a telephone cable for base band transmission. With all embodiments, the HF signals are transmitted over the signal cables 5 and 6 with a low loss. If optical fiber cables are employed, electro-optical converters have to be connected at the coupling points between the RHF cable 1 and the signal cables 5 and 6. As will be appreciated by those skilled in the art, electro-optical converters are not required when the signal cables 5 and 6 are HF cables or telephone cables. Hereinafter, the signal cables will consistently be referred to as "optical fiber cables 5 and 6" instead of "signal cables 5 and 6", and this designation will also refer to the coaxial HF cables and telephone cables, respectively, which can be used instead, as mentioned above. Both optical fiber cables 5 and 6 are connected to the transmitting and receiving device 3, preferably independent of each other. The arrangement is designed and constructed for bi-directional communication.

The two optical fiber cables 5 and 6 are connected to the RHF cable 1 at coupling points K1 to Kn, in a manner suitable for transmitting HF signals. "n" is in this case an even integer number. Electro-optical converters are provided at the coupling points K1 to Kn which are of conventional construction and are therefore not illustrated. HF signals can then be transmitted from a transmitting and receiving device 3 to the antenna of a vehicle radio transceiver or a portable radio transceiver traveling along the RHF cable 1, and vice versa.

The RHF cable 1 and the two optical fiber cables 5 and 6 are advantageously installed with a spatial separation therebetween. In particular, the two optical fiber cables 5 and 6 have a large spatial separation therebetween. They can advantageously be installed on the two opposing walls of the tunnel T. For tunnel sections with two or more tunnel tubes, the optical fiber cables 5 and 6 can also be installed in different tunnel tubes. This will significantly reduce the probability that both optical fiber cables 5 and 6 are damaged simultaneously. The arrangement will thus remain operational even if one of the optical fiber cables 5 and 6 is damaged. The HF signals are then carried by the respective other optical fiber cable 5 or 6.

Figure 2:
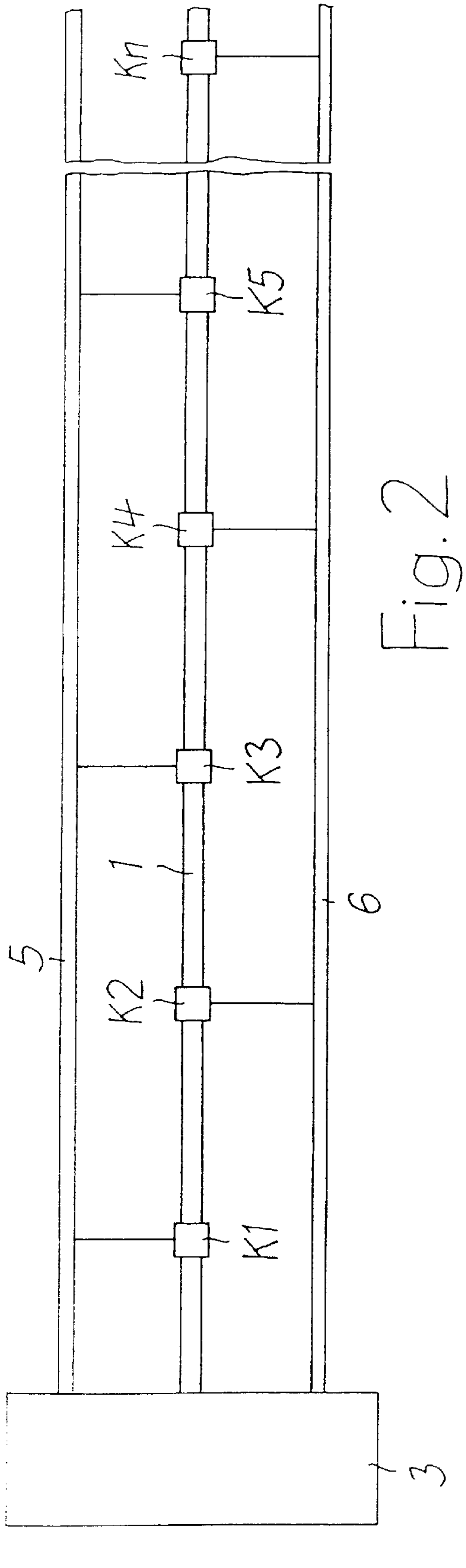
FIG. 2 is a schematic diagram of a modification of the arrangement of FIG. 1.

This is accomplished by connecting both optical fiber cables 5 and 6 to the RHF cable 1 at the coupling points K1 to Kn in an alternating fashion, as illustrated in FIG. 2. The optical fiber cable 5 is connected to the RHF cable 1 at the odd numbered coupling points K1, K3, K5, . . . Kn±1. The optical fiber cable 6 is connected to the RHF cable 1 at the even numbered coupling points K2, K4, K6, . . . Kn. As illustrated in FIG. 2, the numbers are counted continuously, starting at the transmitting and receiving device 3. The coupling points K1 to Kn are constructed analogous to those found in an arrangement with only a single optical fiber cable. Consequently, only the second optical fiber cable is required to enhance the reliability of the arrangement.

The arrangement of FIG. 2 operates, for example, as follows:

HF signals received from the transmitter S of the transmitting and receiving device 3 are fed at the coupling points K1 to Kn from optical fiber cables 5 and 6 into the RHF cable 1 via electro-optical converters connected therebetween. The HF signals can then be received along the RHF cable 1 with a suitable antenna. HF signals fed into the RHF cable 1 from a vehicle radio transceiver or a portable radio transceiver are coupled into the cables 5 and 6 at the coupling points K1 to Kn via the converters for low loss transmission to the receiver E of the transmitting and receiving device 3. In addition to the converters, the coupling points K1 to Kn can also include bi-directional amplifiers with filters for separating the different frequencies used in the two transmission directions.

For example, if the optical fiber cable 5 or the associated portion of the transmitting and receiving device 3 malfunctions, then the optical fiber cable 6 keeps the arrangement operational. The HF signals received from the transmitting and receiving device 3 are then coupled into the RHF cable 1 only via the even numbered coupling points K2 to Kn. A sufficiently high receive level can be maintained along the RHF cable 1 with a proper design. Moreover, HF signals fed into the RHF cable 1 will then also reliably reach the transmitting and receiving device 3.

Figure 3:
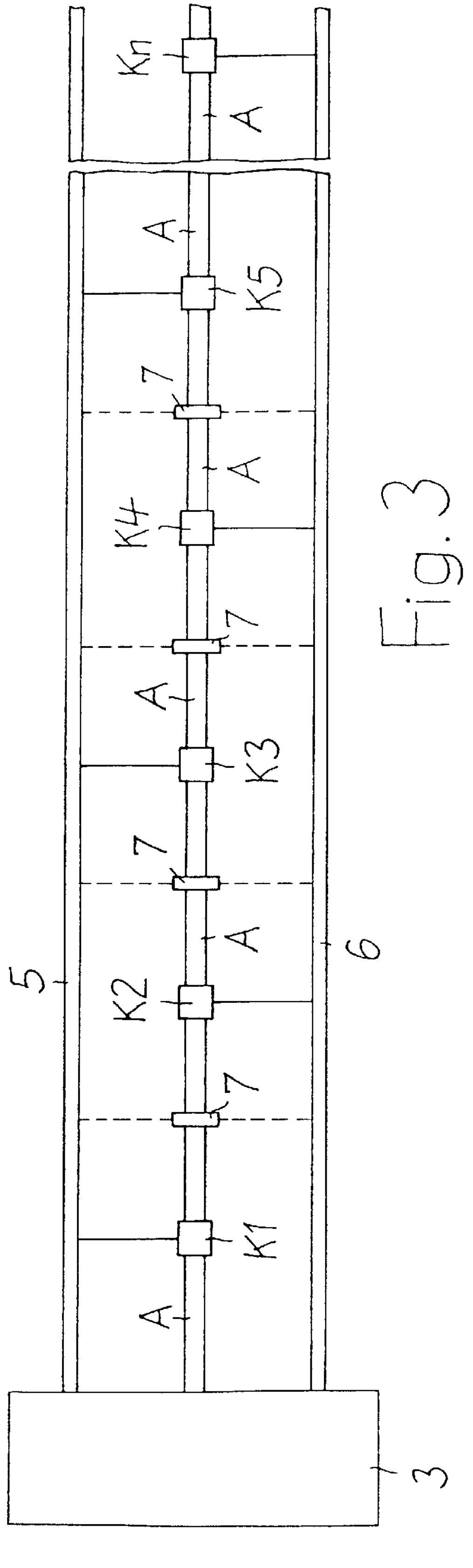
FIG. 3 is a schematic diagram of a modified embodiment of the arrangement of FIG. 2.

In one embodiment of the arrangement, the RHF cable 1 can also be subdivided into segments A which are arranged consecutively in the longitudinal direction, as illustrated in FIG. 3. In each segment A, there is arranged one of the coupling points K1 to Kn, preferably symmetrically. Between the segments A there are arranged switching elements 7 for providing a through-connection between the segments A. This is necessary if one of the optical fiber cables 5 or 6 malfunctions. An arrangement of this type is described, for example, in DE 195 03 744 A1.

Figure 4:
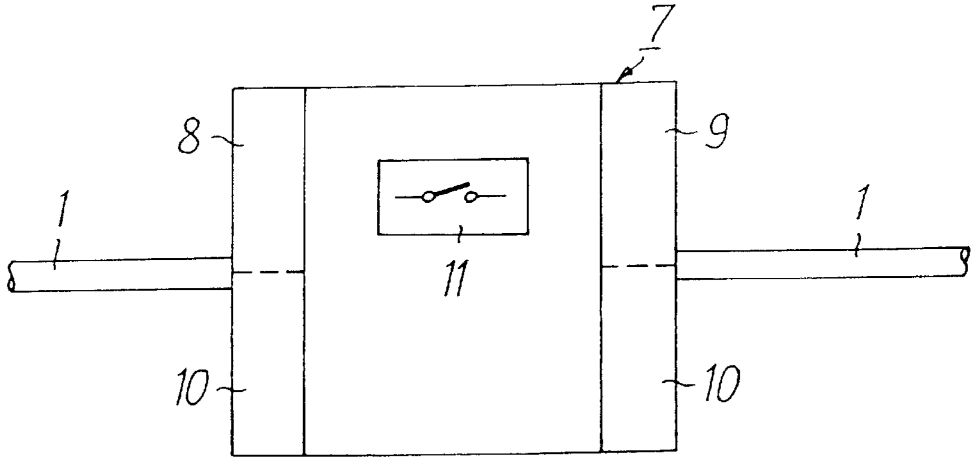
FIG. 4 is an enlarged detail of the switching arrangement found in FIG. 3.

As illustrated in FIG. 4, a switching element 7 can include essentially two receivers 8 and 9, at least one evaluation unit 10 and a switch 11. In the depicted embodiment, a respective evaluation unit 10 is associated with each receiver 8 and 9. The receivers 8 and 9 are adapted to receive a pilot signal which is continuously fed into the optical fiber cables 5 and 6 by the transmitter S of the transmitting and receiving device 3. The receivers 8, 9 can be conventional receivers. The output signal of the receivers 8 and 9 is evaluated and processed by the respective evaluation unit 10. That evaluation unit 10 is here provided with a decision unit and a logic circuit. The switch 11 which can be implemented as a mechanical switch or as an electronic switch, remains open for as long as the arrangement is operating error-free. The adjacent segments of the RHF cable are then not electrically connected with each other.

If one of the optical fiber cables 5 and 6 or the associated portion of the transmitting and receiving device 3 malfunctions and the pilot signal therefore is no longer received by one of the receivers 8 or 9 of the switching element 7, then this situation will be detected by the associated evaluation unit 10. An HF signal would then no longer be received by the respective segments A of the RHF cable 1; consequently, no HF signal can be transmitted onward. The evaluation unit 10 then immediately closes the switches 11, thereby providing a conductive path between the two segments of the RHF cable 1 which are connected to the switching element 7. The arrangement is then again fully functional, as described above.

Figure 5:
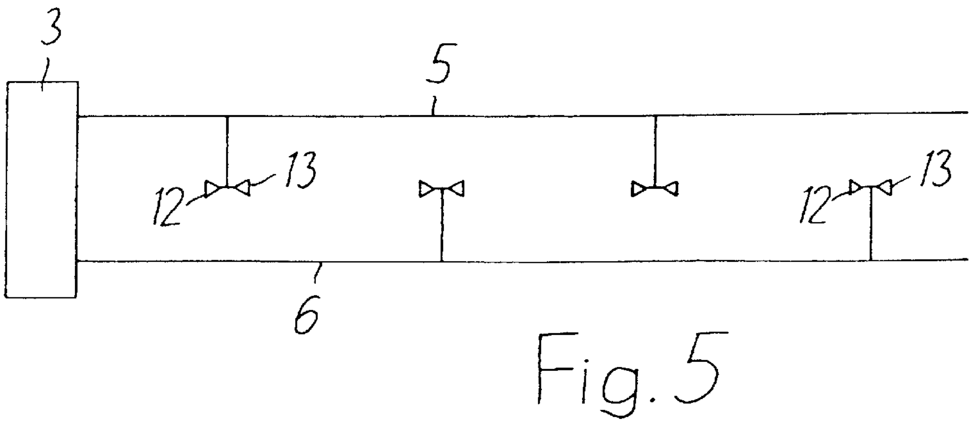
FIG. 5 is a schematic diagram of a modification of the arrangement of FIG. 3.

In the embodiment of the arrangement according to FIG. 5, directional antennae 12 and 13 are employed instead of the RHF cable 1 and the segments A, respectively. Each pair of directional antennae 12, 13 is alternatingly coupled to the optical fiber cables 5 and 6. The arrangements operates in the same manner as the arrangement of FIG. 3. However, no switching elements 7 are required with this embodiment.

The embodiments described above admirably achieve the objects of the invention. However, it will be appreciated that departures can be made by those skilled in the art without departing from the spirit and scope of the invention which is limited only by the following claims.

What is claimed is:

1. Arrangement for transmitting, radiating and receiving high-frequency signals from a transmitting and receiving device, the arrangement comprising:

(a) high-frequency element having a single radiating a high-frequency cable or row of antennas capable of guiding electromagnetic waves, the high-frequency element having a series of spaced apart alternating odd numbered coupling points ($K_1$–$K_{2n\pm1}$) and even numbered coupling ($K^2$–$K_{2n}$) starting at the transmitting and receiving device;

(b) a fist signal cable extending parallel to the high-frequency element, the signal cable coupled to the high-frequency element at the odd numbered coupling points ($K_1$–$K_{2n\pm1}$) in a manner suitable for carrying the high-frequency signals; and (c) a second signal cable parallel to the high-frequency element and with a significant spatial separation to the first signal cable, the second signal cable coupled to the high-frequency element at the even numbered coupling points ($K_2$–$K_{2n}$) in a manner suitable for carrying the high-frequency signals.

2. Arrangement according to claim 1, wherein the high-frequency element is constructed from a plurality of segments of the single radiating high-frequency cable arranged sequentially in a longitudinal direction, one of the coupling points provided in each segment, a switching element disposed between adjacent segments for creating a transmission path for the high-frequency signals, if required.

3. Arrangement according to claim 1, wherein the high-frequency element is constructed from directional antennae which are spaced apart from each other.

4. Arrangement according to claim 1, wherein the first and second signal cables are attached to opposing tunnel walls.

5. Arrangement according to claim 1, wherein the first and second signal cables are attached to different parallel tunnel tubes.

6. Arrangement according to claim 1, wherein the first and second signal cables are optic fiber cables.

* * * * *